(12) United States Patent
Gaumann et al.

(10) Patent No.: US 7,001,566 B2
(45) Date of Patent: Feb. 21, 2006

(54) BLOW MOLDING APPARATUS

(75) Inventors: Udo Gaumann, Lützel-Wiebelsbach (DE); Guenther Wenger, Rottenacker (DE)

(73) Assignee: Etimex Technical Components GmbH, Rottenacker (DE)

( * ) Notice: Subject to any disclaimer, the term of this patent is extended or adjusted under 35 U.S.C. 154(b) by 477 days.

(21) Appl. No.: 10/219,035

(22) Filed: Aug. 14, 2002

(65) Prior Publication Data
US 2003/0015828 A1 Jan. 23, 2003

Related U.S. Application Data

(63) Continuation of application No. PCT/EP01/01622, filed on Feb. 14, 2001.

(30) Foreign Application Priority Data
Feb. 14, 2000 (GB) .................... 0003358

(51) Int. Cl.
  *B29C 49/04* (2006.01)
  *B29C 49/58* (2006.01)
(52) U.S. Cl. .................... 264/540; 425/532
(58) Field of Classification Search ............... 264/540; 425/532
  See application file for complete search history.

(56) References Cited

U.S. PATENT DOCUMENTS 4,645,447 A   2/1987   Sumitomo

FOREIGN PATENT DOCUMENTS

| DE | 3527308 C2 | 2/1987 |
|---|---|---|
| DE | 3934297 A | 4/1991 |
| DE | 19845269 A | 4/2000 |
| EP | 0301694 A | 2/1989 |
| EP | 0705678 A | 4/1996 |
| GB | 1224499 | 3/1971 |
| JP | 57-128517 A | 8/1982 |

OTHER PUBLICATIONS

Patent Abstracts of Japan, vol. 017, No. 455 (M-1466) (Apr. 27, 1993) (JP 05-104613 A).
Patent Abstracts of Japan, vol. 012, No. 416 (M-759) (Jun. 25, 1988) (JP 63 153114 A).
Patent Abstracts of Japan, vol. 014, No. 399 (M-1001) (May 2, 1990) (JP 02 117809 A).

*Primary Examiner*—Suzanne E. McDowell
(74) *Attorney, Agent, or Firm*—Leydig, Voit & Mayer, Ltd.

(57) ABSTRACT

An apparatus for blow-molding a parison, the apparatus comprising a mold defining a cavity into which a parison may be introduced for blow-molding, a die for extruding the parison into said cavity, and means for blowing a gas around the outside of the parison in said cavity, the means for blowing a gas around the parison comprising (a) a distributor located at the entrance of the mold cavity for emitting gas around the circumference of the parison and (b) means for injecting gas directly into said distributor, wherein during use the die is separated from the distributor by unenclosed space.

24 Claims, 2 Drawing Sheets

BLOW MOLDING APPARATUS

The present invention relates to an improved method and apparatus for blow molding hollow articles, such as pipes, sectional tubing, containers and the like. In particular, though not exclusively, the present invention relates to an improved method and apparatus for blow molding curved or bent pipes.

Various methods of blow molding hollow articles are known. Typically, such methods involve extruding a tubular formation of a thermoplastics material through an orifice to form a parison, which is subsequently expanded in a blow mold. The parison may be assisted through the mold, for example, by gravity or by a combination of gravity and suction. An example of the latter is described in U.S. Pat. No. 4,645,447.

EP 705678A discloses a molding apparatus and process in which a flow of air or other gas is provided between the outside of the parison and the wall of the mold cavity as the parison drops through the cavity. This is said to facilitate the passage of the parison through the mold cavity. The apparatus disclosed provides an airtight cover between the top of the mold and the die from which the parison is extruded. Air is injected into the space enclosed by the cover, from where it passes down into the mold cavity itself around the outside of the parison. This arrangement has certain disadvantages. In particular, the presence of the cover means that it is not possible to observe visually the passage of the parison from the die into the mold cavity. This is significant because it is often necessary to make minor adjustments to the extruder in order to ensure that the parison drops straight, or that the output speed or parison diameter are correct, especially when introducing a new feedstock or a new batch of the same feedstock. Adjustments can take up to 20 blow-molding cycles. If the parison can be observed passing out of the die and into the mold, it is possible to make such adjustments while the process continues. However, in the case of EP 705678A, it would be necessary to halt the process and remove the cover every time a minor adjustment needed to be made. Additionally, the fact that the air is injected into the large chamber enclosed by the cover before passing down into the mold cavity means that it is less easy to control the passage of the air within the mold cavity. This can lead to problems such as vibration of the parison as it descends in the cavity. A further disadvantage of this construction is that after blow-molding a parison, there is a portion of plastics material left between the die and the top of the mold. This must be removed before the next parison is dropped, and the presence of the cover makes this a more complex and time-consuming procedure.

We have now found a way to alleviate the abovementioned disadvantages. This is achieved by the present invention which provides an apparatus for blow-molding a parison, comprising a mold defining a cavity into which a parison may be introduced for blow-molding, a die for extruding the parison into said cavity, and means for blowing a gas around the outside of the parison in said cavity, characterized in that the means for blowing a gas around the parison comprises a) a distributor located at the entrance of the mold cavity for emitting gas around the circumference of the parison, and b) means for injecting gas directly into said distributor, wherein during use the die is separated from the distributor by unenclosed space.

Preferably, the distributor is arranged such that gas injected into it is distributed around the circumference of the parison before coming into contact with the parison. It is also preferred that the gas does not come into contact with any part of the parison until that part is located within the mold cavity. Blowing air directly onto the parison, especially before the parison is inside the mold cavity, may result in excessive or asymmetric forces on it, causing it to distort or not to fall straight.

Preferably, the distributor is an annular arrangement located at the entrance of the mold cavity, having a central aperture for passage of the parison, an opening for attachment to a supply of gas, and at least one opening facing into the mold cavity for egress of the gas around the outside of the parison. The opening or openings for egress of the gas are suitably located so as to ensure an even distribution of gas around the circumference of the parison.

In a preferred construction, the distributor comprises an annular piece which fits over the opening of the mold cavity, and has an internal annular chamber opening into the mold cavity and connected to an external source of gas. The inner wall of the internal annular chamber preferably defines the central aperture through which the parison enters the mold cavity. Gas injected into the internal chamber thus exits the chamber through its annular opening around the outside of the parison. In one embodiment the annular chamber is divided into two concentric chambers by a cylindrical wall, the chambers being connected above the wall. The outer chamber receives the injected gas, which flows into the inner chamber where it exits through the bottom around the outside of the parison. The advantage of this construction is that the wall provides an initial barrier to the injected gas, which ensures a more even flow of gas when it exits the distributor into the mold cavity. The annular chamber or chambers may optionally be divided longitudinally, depending on the construction of the distributor. In particular, the inner chamber may be divided longitudinally into four, preferably six compartments. This helps promote a more uniform flow of gas out of the distributor. The chambers are usually of circular cross-section, but may not necessarily be so. The gas may be injected into the chambers at more than one point. The distributor may be an integral piece, but is more usually formed of two halves which are connected together when the two halves of the mold join. The two halves themselves may of course be formed of more than one piece. The distributor is usually constructed of metal, and may have a coating on the interior surface defining the aperture through which the parison passes, in order to reduce the risk of the parison sticking to or being marked by that surface.

We have found that the above arrangement permits a satisfactory flow of air around the outside of the parison, with the attendant advantages that brings, but with a much simpler design than that used in the prior art. This has the particular advantage of permitting the parison exiting from the die to be both viewed and accessed at all times during the blow-molding process, resulting in much greater ease of adjustment of the process when necessary.

The gas blown around the outside of the parison is preferably introduced into the distributor through a Venturi nozzle. The gas is preferably air. Typically, the gas blown around the outside of the parison is the same as that injected into the interior of the parison when it is blown.

The blow-molding process used with the apparatus of the invention is essentially the same as known processes. In the case where the mold comprises two halves, the two mold halves with their respective halves of the distributor are brought together to form a mold cavity having a distributor located at its opening. The cavity may be open-ended.

A parison, formed by extruding a tubular formation of thermoplastics material through an orifice, is introduced into the mold cavity through the central opening of the annular distributor. The thermoplastics material employed may be polyethylene, polypropylene, polyamides, polyesters and thermoplastics elastomers. Appropriate combinations of polymers may also be used.

As the parison drops down into the mold, a gas is blown into the distributor surrounding the parison at the mold opening. The gas exits the distributor all around the circumference of the parison and blows downward around the outside of the parison, thereby assisting its flow through the mold. Any suitable gas may be employed. Examples include air, nitrogen carbon dioxide and noble gases such as helium and argon. Mixtures of gases may also be employed. The gas may be recycled for reuse.

Once the parison is fully extended through the length of the mold cavity, it is sealed. This may be achieved by closing the open ends of the parison using any suitable sealing apparatus, for example, clamps or the like. The sealing step may be carried out as the parison emerges from the end of the mold. It is also possible, however, for the parison to be further manipulated on exiting the mold, for example, by bending the parison mechanically. The parison may be sealed after such a bending step.

The parison is then inflated with an overpressure of fluid, such that it takes the shape of the mold. Any suitable fluid may be employed. Suitable gaseous fluids include air, carbon dioxide, nitrogen and noble gases such as helium and argon. Mixtures of gases may also be employed. Suitable liquids include water.

Once the parison is blow-molded into the finished article, the mold is cooled. Optionally, the blow-molded article may also be cooled directly, for example by passing a coolant through it. Suitable coolants include gaseous or liquid media such as carbon dioxide, nitrogen and water. The finished article may then be removed from the mold, typically by separating the mold parts and withdrawing the article.

The process of the present invention is particularly useful for blow-molding hollow articles, such as pipes, sectional tubing, containers and the like. More specifically, the present process is particularly suitable for blow-molding pipes having one or more bends. Such pipes may be formed by molding the parison in molds which define curved tubular cavities. For pipes having multiple bends, molds defining cavities having a plurality of bends may be employed. Alternatively, a plurality of molds may be arranged sequentially. Thus a parison exiting the first mold is preferably drawn through the next, with the help of the stream of gas introduced around the outside of the parison.

According to a further aspect of the present invention, there is provided a process for blow-molding an article, comprising blow-molding a parison in an apparatus as defined above.

These and other aspects of the present invention will now be described with reference to the accompanying drawings, in which.

Figure 1:
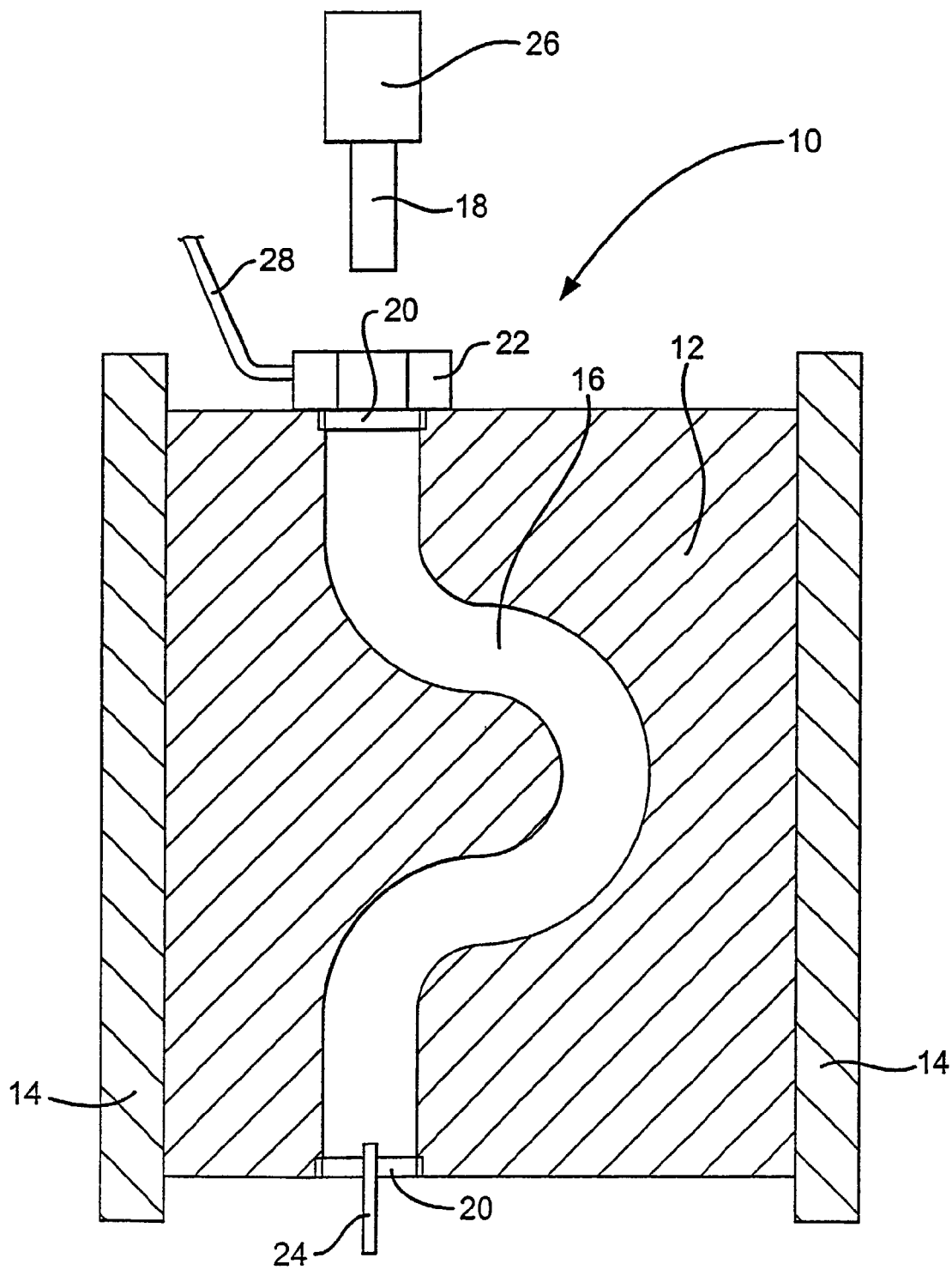
FIG. 1 is a cross-sectional view of the apparatus of the present invention.

Referring to FIG. 1, there is provided an apparatus 10 comprising two mold halves 12, only one of which is shown. The mold halves 12 are mounted on respective molding plates 14 each molding plate being moveable relative to the other to urge the mold halves 12 into an abutting position. Thus positioned, the molding halves 12 define a mold cavity 16, which is adapted to receive a parison 18. The cavity 16 defines the external shape of the article, into which the parison 18 is eventually blow-molded. As can be seen from the Figure, the cavity 16 defines a curved, open-ended passageway. Positioned at each end of the cavity 16 are clamping devices 20.

The apparatus 10 also comprises a distributor 22 positioned at the parison-receiving end of the cavity 16. The distributor is suitable for introducing a gas, typically air, downwardly through the cavity 16. The gas is fed into the distributor via a line 28. Positioned at the opposite end of the cavity 16 is a blowing device 24, which is suitable for blowing air upwardly through the center of the cavity 16.

Figure 2:
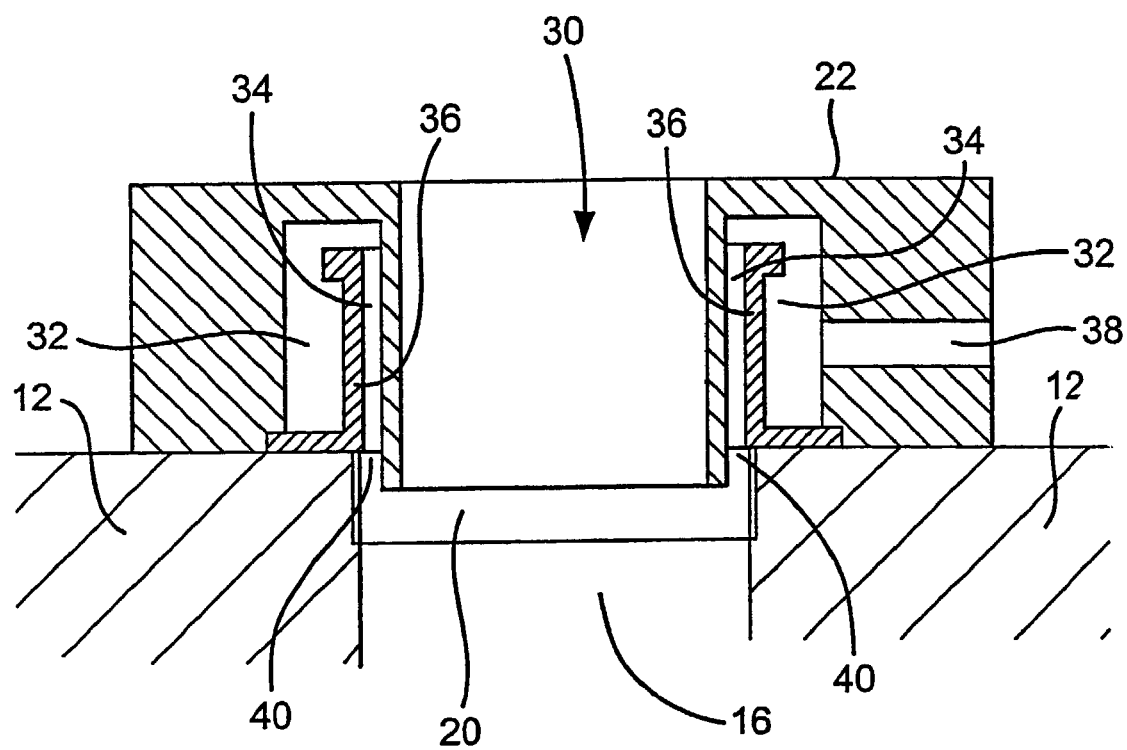
FIG. 2 is a cross-sectional view of the cap which attaches to the mold in order to direct air around the outside of the parison.

The distributor 22 is shown in more detail in FIG. 2. It comprises a molded piece, which sits over the opening of the mold cavity 16. It has a central cylindrical opening 30 for receiving the parison, and a pair of concentric annular chambers 32, 34 separated by a wall 36. In this embodiment, the wall 36 is molded separately from the rest of the cap, and the two parts fitted together in use. A gas, usually air, is injected into the outer chamber 32 through the opening 38. From there it passes over the wall 36 into the inner chamber 34, and thence out through the bottom 40 of chamber 34 into the mold cavity 16, where it is outside the parison dropping through the opening 30.

The apparatus 10 is used in combination with an extruder 26.

In operation, the mold halves 12 are urged together to define a cavity 16, and a cap 22 placed over the opening of the cavity. A parison 18 is then extruded from a thermoplastics material using the extruder 26, from which it drops through the opening 30 in the cap 22 and into the cavity 16 defined by the abutting mold halves 12. At the same time, air is introduced into the opening 38 of the cap 22. The air flows around the chambers 32, 34 and exits through the annular opening 40, from where it flows around the outside of the parison so as to draw the parison down through the cavity 16.

It can be seen from FIG. 1 that at all times during the blow-molding process, the parison 18 emerging from the die of the extruder 26 is fully visible and accessible, and thus any adjustments which need to be made can be performed without any interruption of the procedure.

When the parison emerges through the opposite end of the cavity, both ends of the parison are clamped using the clamping devices 20. The parison is thus sealed, and air is introduced into the parison using the blowing device 24. This causes the parison to inflate and take up the form of the cavity 16.

The mold 12 is then cooled, and opened so that the blow-molded article (e.g. a curved pipe precursor) can be removed.

What is claimed is:

1. An apparatus for blow-molding a parison, said parison having a circumference, said apparatus comprising a mold defining a cavity for receiving said parison, a die for extruding the parison into said cavity, and a blower for blowing a gas around the outside of the parison in said cavity, said mold cavity having an entrance, the blower comprising a distributor located at the entrance of the mold cavity for emitting gas around the circumference of the parison, and an injector for injecting gas directly into said distributor, the distributor comprising means for distributing the gas injected into said distributor around the circumference of the parison before the gas exits the distributor and comes into contact with the parison, wherein the die is separated from the distributor by an unenclosed space during use.

2. The apparatus according to claim 1, wherein the distributor and mold cavity are arranged such that the gas injected into the distributor exits directly into the mold cavity.

3. An apparatus for blow-molding a parison, said parison having a circumference, said apparatus comprising
a mold defining a cavity for receiving said parison,
a die for extruding the parison into said cavity, and
a blower for blowing a gas around the outside of the parison in said cavity, said mold cavity having an entrance, the blower comprising a distributor located at the entrance of the mold cavity for emitting gas around the circumference of the parison, and an injector for injecting gas directly into said distributor, wherein the distributor comprises a central aperture for passage of the parison, an opening for attachment to a supply of gas, and at least one opening facing into the mold cavity for egress of the gas around the outside of the parison, and wherein the die is separated from the distributor by an unenclosed space during use.

4. The apparatus according to claim 3, wherein the at least one opening for egress of the gas is located so as to ensure an even distribution of gas around the circumference of the parison.

5. The apparatus according to claim 3, wherein the distributor comprises an annular piece which fits over the entrance of the mold cavity, said annular piece having an internal annular chamber opening into the mold cavity and connected to an external source of gas, the internal annular chamber having an inner wall which defines the central aperture through which the parison enters the mold cavity.

6. The apparatus according to claim 5, wherein the internal annular chamber is divided into two concentric chambers by a cylindrical wall, said two concentric chambers including an inner chamber and an outer chamber and being connected above the cylindrical wall, the outer chamber being connected to an inlet for injected gas, and the inner chamber having an annular opening at its bottom for exit of the gas.

7. The apparatus according to claim 6, wherein the inner chamber is divided longitudinally into at least four compartments.

8. The apparatus according to claim 3, wherein the distributor and mold cavity are arranged such that the gas injected into the distributor exits directly into the mold cavity.

9. An apparatus for blow-molding a parison, said parison having a circumference, said apparatus comprising
a mold defining a cavity for receiving said parison, the mold comprising two halves,
a die for extruding the parison into said cavity, and
a blower for blowing a gas around the outside of the parison in said cavity, said mold cavity having an entrance, the blower comprising a distributor located at the entrance of the mold cavity for emitting gas around the circumference of the parison, and an injector for injecting gas directly into said distributor, the distributor is formed of two parts each associated with a respective half of the mold, said two parts being connected together when the two halves of the mold join, wherein the die is separated from the distributor by an unenclosed space during use.

10. The apparatus according to claim 9, wherein the distributor and mold cavity are arranged such that the gas injected into the distributor exits directly into the mold cavity.

11. An apparatus for blow-molding a parison, said parison having a circumference, said apparatus comprising
a mold defining a cavity for receiving said parison,
a die for extruding the parison into said cavity,
a blower for blowing a gas around the outside of the parison in said cavity, said mold cavity having an entrance, the blower comprising a distributor located at the entrance of the mold cavity for emitting gas around the circumference of the parison, and an injector for injecting gas directly into said distributor, wherein the die is separated from the distributor by an unenclosed space during use, and
a venturi nozzle, said gas blown around the outside of the parison being introduced into the distributor through said venturi nozzle.

12. The apparatus according to claim 11, wherein the distributor and mold cavity are arranged such that the gas injected into the distributor exits directly into the mold cavity.

13. A process for blow-molding an article, comprising the steps of
extruding a parison having a circumference,
introducing said parison into a mold cavity,
injecting gas into a distributor located at, but separate from, an entrance of the mold cavity,
emitting gas from the distributor around the parison within the mold cavity, and
distributing said gas injected into said distributor around the circumference of the parison before the gas exits the distributor and comes into contact with the parison.

14. The process of claim 13 wherein the gas injected into the distributor exits said distributor directly into said mold cavity.

15. A process for blow-molding an article, comprising the steps of
extruding a parison having a circumference,
introducing the parison into a mold cavity through a central aperture in a the distributor located at, but separate from, an entrance of the mold cavity
injecting gas from a supply of gas through an opening in the distributor, and
emitting gas from at least one distributor opening facing into the mold cavity around the parison within the mold cavity.

16. The process of claim 15 wherein said emitting step comprises the step of evenly distributing said gas from said at least one distributor opening around the circumference of the parison.

17. The process of claim 15 wherein the distributor comprises an annular piece which fits over the entrance of the mold cavity and defines an internal annular chamber that opens into the mold cavity and has an inner wall that defines the central aperture, and further comprising the step of connecting the internal annular chamber to an external source of gas.

18. The process of claim 17 wherein the annular chamber is divided into an inner and outer chamber by a cylindrical wall, the inner and outer chamber being connected above the cylindrical wall, the injecting step comprising the step of connecting said outer chamber to an inlet for injecting gas, and the emitting step comprises the step of providing an opening at the bottom of the inner chamber for exit of the gas.

19. The process of claim 18 wherein the inner chamber is divided into at least four compartments.

20. The process of claim 15 wherein the gas injected into the distributor exits said distributor directly into said mold cavity.

21. A process for blow-molding an article, comprising the steps of
   extruding a parison having a circumference,
   providing a distributor with two parts and a mold with two halves, associating said parts with a respective half, and joining said mold halves together to connect said parts together to form a mold cavity,
   introducing said parison into said mold cavity,
   injecting gas into a distributor located at, but separate from, an entrance of the mold cavity, and
   emitting gas from the distributor around the parison within the mold cavity.

22. The process of claim 21 wherein the gas injected into the distributor exits said distributor directly into said mold cavity.

23. A process for blow-molding an article, comprising the steps of
   extruding a parison having a circumference,
   introducing said parison into a mold cavity,
   injecting gas from a venturi nozzle into a distributor located at, but separate from, an entrance of the mold cavity, and
   emitting gas from the distributor around the parison within the mold cavity.

24. The process of claim 23 wherein the gas injected into the distributor exits said distributor directly into said mold cavity.

* * * * *